Patented Feb. 24, 1948

2,436,509

UNITED STATES PATENT OFFICE 2,436,509

METHOD FOR OBTAINING GRANULAR ALUMINA

Charles L. Faust, Columbus, Ohio, assignor, by mesne assignments, to Reconstruction Finance Corporation, a corporation of the United States No Drawing. Application May 10, 1945, Serial No. 593,097

13 Claims. (Cl. 23—143)

This invention relates to production of insoluble compounds of trivalent metals, and more particularly to methods of producing alumina directly from alum. Specifically, this invention relates to methods for obtaining alumina that is low in potassium from sources such as clays, mine tailings, or ores, and to methods for obtaining from potassium alums alumina that is substantially free from potassium.

A specific example, which is illustrative of the problems here involved, is the production of alumina from mine tailings. The alumina oxide content of tailings from milling certain copper ores may be approximately 17 per cent and this may be increased by modern concentration methods to approximately 30 per cent. As is well known, the alumina in these tailings can be recovered by digesting the tailings with sulphuric acid, converting to an alum, and then recovering alumina from the alum. Such alum can be obtained essentially free from heavy-metal impurities, consisting solely of sulphates of a monovalent cation and aluminum. The alum extracted from mine tailings will be, at least in part, a potassium alum, since the tailings contain potassium as the monovalent cation.

Alums recovered as intermediate products in processing mill tailings, clays, and the like have been treated in various ways to produce alumina. Usually the alum has been processed directly, either by thermal decomposition or by precipitation methods. One process is to decompose the alum thermally by calcination, to yield insoluble alumina along with sulphurous gases and soluble products that may be removed from the alumina by leaching. As a result of calcining, the alumina is recovered in suitable physical form to resist leaching, but it usually contains potassium as an impurity. The potassium may be held fused in the alumina or may have reacted chemically with the alumina during calcination, but in any event it is extremely resistant to purification treatment.

Another method of recovering alumina from alum has been to dissolve alum in water and add alkaline or hydroxylating reagents. These precipitate insoluble aluminum hydroxide from the solution and leave sulphate ions in solution. However, the separation is not complete and the precipitate, which is generally undesirably flocculent and gelatinous, adsorbs foreign ions that are extremely difficult to remove. Potassium is particularly and undesirably adsorbed. When the precipitated aluminum hydroxide is calcined to form alumina, the impurity potassium has been retained in the alumina.

The impurities retained by alumina recovered either by the calcination method or by the precipitation method are undesirable in subsequent commercial treatment of the alumina. For example, in the manufacture of metallic aluminum from alumina by electrochemical treatment, the presence of potassium is especially undesirable because in addition to plating out on the cathode, it causes disintegration of the lining of the electrolytic cells. Thus it interferes with operation of the reduction cell as well as lowers the purity of the final product. For commercial purposes, it is desirable to provide alumina in which the potassium content calculated as potassium oxide ($K_2O$) is less than 0.3 per cent and preferably as much under 0.2 per cent as possible. For some uses of alumina, such as in a catalyst, the potassium content calculated as potassium oxide should be less than 0.02 per cent and as much lower as is feasible. Neither the calcination method of treating alum nor the precipitation method has produced alumina of the desired purity with respect to alkali metals, especially with respect to potassium.

Similar difficulties are encountered with commercial processes in obtaining sufficiently pure compounds of trivalent metal other than those of aluminum. This is true not only where the compound sought is an oxide, but also where other insoluble compounds of trivalent metals are sought in relatively pure condition. Moreover, similar difficulties are encountered in obtaining such insoluble compounds in desirably firm physical form as distinguished from gelatinous or flocculent form.

An object of this invention, therefore, is to provide a new and improved method for producing insoluble compounds of trivalent metal and especially for producing relatively pure oxides of trivalent metals.

A further object is to produce hydroxides or hydrated oxides of trivalent metals in a form that physically is relatively easy to process commercially rather than in the usual gelatinous and flocculent form of hydrates.

Another object of this invention is to provide methods of producing, from an alum, trivalent metal hydroxides in firm, non-genatinous condition and particularly to provide aluminum hydroxide, directly from normal hydrated alum, in a form that is apparently crystalline and is readily filterable.

A still further object of this invention is to provide a new and improved method of treating alum to produce alumina that is substantially free from potassium.

This invention will be illustrated by reference to a preferred embodiment, but it is understood that the invention is not limited to the specific process nor examples set forth. The invention is capable of other embodiments and variations that will now become apparent to those skilled in the art. The terminology herein is intended for description but not for limitation beyond the requirements of the prior art.

Various benefits and advantages of this invention are attained by reacting a soluble trivalent metal salt in solid state with an ion normally composing an insoluble compound with the trivalent metal. The salt is treated preferably in an electrolyte containing the ion to be reacted with the soluble salt. The electrolyte either is of relatively low solubility for the soluble salt, or contains an agent to minimize or to inhibit dissolution of the salt.

In specific preferred practice of this invention, a soluble salt of trivalent metal, for example aluminum sulfate or other soluble aluminum salt, is ground to small particles and then is treated with solution containing both the ion to be substituted and agent to keep the salt in solid form. The mixture is stirred slightly and allowed to stand until reaction to form the insoluble product is complete. The insoluble trivalent metal compound then is separated from the solution, and by a series of water extractions is freed of soluble matter.

For example an alum produced from aluminum-bearing clays, or from mine tailings such as hereinabove described, is ground to a powder having a fairly uniform particle size. If the powder particles are too small, difficulty will be encountered in preventing dissolution thereof during the ion exchange reaction. Particles too large in size will result in incomplete reaction of the alum. Particle sizes between 12 and 60 mesh have been found preferable, although the optimum particle size will vary with the materials involved.

The powdered alum is then treated with hydroxylating agent and agent capable of preventing dissolution of the alum during the hydroxylating process. Agents for preventing dissolution of the alum, hereinafter referred to generally as inhibiting agents, include certain organic compounds miscible with water in all proportions. Such are water-soluble organic hydroxy compounds, for example glycerine, or water-soluble organic amines, for example ethanolamine, preferably triethanolamine, or pyridine. These examples are illustrative and represent preferred inhibiting agents but are not restrictive, for any compound may be used as an inhibiting agent if it prevents dissolution of the alum and permits reaction of the hydroxylating ion.

Members of the alkali-metal hydroxide group, potassium hydroxide and sodium hydroxide and including ammonium hydroxide, may be utilized as hydroxylating agents in carrying out the method of the invention. Other soluble inorganic bases whose cations form soluble sulfates may also be used as hydroxylating agents. Such bases of course are hydroxylating agents since they provide hydroxyl ions. The inhibiting agents and hydroxylating agents above named may be used in any combination with each other.

In order to reduce dissolution of the alum to a minimum, concentrated hydroxylating solutions are preferred. The limits of concentration of the hydroxylating solution must be determined empirically for each hydroxylating agent, but substantially at least a stoichiometric amount of the agent, based on the alumina in the alum, should be present in the solution used in order to obtain the most satisfactory results.

The lower limit of the amount of inhibiting agent that can be successfully used with a given hydroxylating agent may be determined for each pair of reactants. For example, only 0.05 mole of triethanolamine is required to reduce to 0.00% the potassium content of the alumina derived from a given weight of potassium aluminum alum when used with ammonium hydroxide. However, approximately 0.1 mole of triethanolamine is required to reduce to 0.00% the potassium content in the alumina derived from the same weight of the same alum when potassium hydroxide is used. The percentages of potassium contamination referred to throughout the specification, unless otherwise stated, were verified by spectrographic analysis.

Certain hydroxylating agents are more effective with a given inhibiting agent than are others. For example, potassium hydroxide or sodium hydroxide is more effective than ammonium hydroxide when used with glycerine; with triethanolamine, however, ammonium hydroxide is the most effective of the hydroxylating agents.

After the solution containing the hydroxylating agent and the inhibiting agent has been added to the powdered alum, the mixture is stirred slightly and allowed to remain until the reaction is complete. The length of time required to complete the reaction is dependent, of course, on the particular ingredients used and may vary from about ¾ to about 2 hours. Experiments have shown that continuing the reaction for as long as 15 hours has no effect in increasing the potassium contamination, so that the time of reaction is not at all critical, beyond that required for completion of the reaction.

When the reaction is complete, the clear alum crystals have turned to a milky opaque color, indicating that the sulfate which was combined with the aluminum has been replaced by the hydroxyl ion to produce a crystalline aluminum hydroxide. The mixture then is filtered to separate the insoluble hydroxide from the soluble products of the reaction. The aluminum hydroxide thus formed retains substantially the same granular structure as the alum crystals in which it has formed. This permits rapid filtering and washing.

All soluble matter is removed from the aluminum hydroxide by a series of hot water extractions and, if the end product is to be alumina, the aluminum hydroxide is dried and calcined. This will be familiar to those skilled in this art.

The alumina thus produced usually analyzes approximately 0.00% potassium content and is sufficiently pure otherwise to be suitable for use in reduction cells, or for the manufacture of refractories, insulators, etc., where low alkali metal content is essential, or for activated alumina used in catalytic processes, etc.

The following specific example is given in sufficient detail to enable anyone skilled in the art to carry out the invention.

In the proportion of one hundred grams, normal potassium alum in crystals varying in size from 12 to 60 mesh is treated with a solution consisting of 42 cc. (approximately 6 moles based on the alumina content of the alum) of ammonium hydroxide solution (28% of ammonia) and 41.5 cc. (approximately 3 moles based on the alumina content of the alum) of triethanolamine well mixed together. The mixture is stirred mildly and then allowed to stand. After a period of approximately 1 hour, completion of the ion exchange reaction becomes apparent by the transparent alum crystals becoming opaque. The alkali-metal and ammonium sulfates are dissolved out by several 100 cc. hot water extractions with 15 minute digestions, and settling and filtering of the aluminum hydroxide.

Aluminum hydroxide containing 0.00% potassium was obtained after three extractions. Correspondingly pure alumina may be obtained from this aluminum hydroxide by drying the hydroxide and calcining it in a manner well known in the art.

Potassium hydroxide may be substituted for ammonium hydroxide in the above example. In one specific test on 100 grams of normal potassium alum crystals, the treating solution consisted of 35 grams (6 moles based on the alumina content of the alum) of potassium hydroxide, 42 cc. of water, and 13.6 cc. (approximately 1 mole based on the alumina content of the alum) of triethanolamine. Aluminum hydroxide free of potassium was obtained.

Sodium hydroxide may also be used. One typical treating solution for 100 grams of normal potassium alum contained 25 grams (6 moles based on the alumina content of the alum) of sodium hydroxide, 42 cc. of water, and 13.6 (approximately 1 mole based on the alumina content of the alum) of triethanolamine. Aluminum hydroxide free of potassium was obtained.

In another test, complete elimination of potassium was obtained by treating 100 grams of normal potassium alum with a solution containing 25 grams (6 moles based on the alumina content of the alum) of sodium hydroxide and 9.2 grams (3 moles based on the alumina content of the alum) of glycerine.

Essentially the same results with potassium aluminum alum were obtained in the presence of a solution containing 6 moles, based on the alumina content of the alum, of ammonium hydroxide and 3 moles, based on the alumina content of the alum, of pyridine.

These several examples are intended to illustrate broadly and interchangeably the use of inhibiting agents and hydroxylating agents under this invention. The amounts indicate preferred concentrations; greater amounts may be used but without corresponding advantage in economy.

The basic theory underlying this ion exchange reaction is that the reacting ion, the hydroxyl ion in the above-cited examples, substitutes directly in the solid crystalline compound in place of the anion therein attached to the trivalent metal. As a result, the crystalline shape of the insoluble trivalent metal compound formed is substantially the same as that of the original compound, the product is of desirably firm physical condition, and there is no contamination from adsorption of ions, such as potassium.

The method herein described, for obtaining insoluble trivalent metal compounds from soluble trivalent metal compounds discloses an ion exchange reaction on a mass level not heretofore attained. The efficacy of this method is attested by the fact that potassium hydroxide, itself a source of high concentration of potassium ions, may be advantageously used as an hydroxylating agent to produce alumina having 0.00% potassium contamination.

Variations in the procedures above outlined will occur to those skilled in the art. For example, particle size of the material to be treated, degree of agitation of the treating solution and material to be treated, concentration of the hydroxylating agent, and ingredients or combinations of ingredients that may be used may be varied to suit the particular object to be accomplished. The word "alum," as used in the specification and the appended claims, is defined as a group of double salts of the general formula M′M‴(SO$_4$)$_2$.24H$_2$O wherein M′ normally is a monovalent ion, such as sodium, potassium, rubidium, ammonium, caesium, etc., and M‴ is a trivalent ion, such as iron, chromium, aluminum, indium, thallium, vanadium, cobalt, titanium, and rhodium. An "ion exchange reaction," as used in the specification and the appended claims, relates to an exchange of ions between a solid and a liquid during which little or none of the solid is dissolved.

The solubility referred to in the claims means water-soluble.

It is apparent from the above description that a new and improved method has been devised for obtaining an insoluble compound of a trivalent metal from a soluble compound of that metal without any intermediary stage of dissolution of the soluble metal compound.

While in accordance with the patent statutes this invention has been described in such terms as to enable any person skilled in the art to use the same, and the principle thereof has been set forth and the best mode of applying the principle so as to distinguish this invention, the invention is not to be limited by illustrative embodiments herein described, but only as necessarily limited by the prior art taken with the appended claims.

What is claimed is:

1. In a process for obtaining an insoluble, solid, apparently crystalline hydrate of a trivalent metal from a crystalline alum containing said trivalent metal as a part of its crystalline structure, the steps which comprise dispersing said crystalline alum in a mixture of a concentrated aqueous solution of an hydroxide selected from the group consisting of alkali metal hydroxides and ammonium hydroxide with a solution-inhibiting agent selected from the group consisting of glycerine, ethanolamines and pyridine, and allowing the mixture to stand until the negative ion of the alum has been substantially completely replaced by the hydroxyl ion.

2. In a process for obtaining an insoluble, solid, apparently crystalline hydrate of a trivalent metal from a crystalline alum containing said trivalent metal as a part of its crystalline structure, the steps which comprise dispersing said crystalline alum in a mixture of a concentrated aqueous solution of an hydroxide selected from the group consisting of alkali metal hydroxides and ammonium hydroxide with a solution-inhibiting agent selected from the group consisting of glycerine, ethanolamines and pyridine, and allowing the mixture to stand until the negative iron of the alum has been substantially completely replaced by the hydroxyl ion, filtering the mass, and washing free of soluble salts to obtain substantially pure trivalent hydrate in the physical form of the original crystalline alum.

3. In a process for obtaining an insoluble, apparently crystalline hydrate of alumina from an aluminum alum, the steps which comprise dispersing said crystalline alum in a mixture of a concentrated aqueous solution of an hydroxide selected from the group consisting of alkali metal hydroxides and ammonium hydroxide with a solution inhibiting agent selected from the group consisting of glycerine, ethanolamines and pyridine, and allowing the mixture to stand until the negative ion of the alum has been substantially completely replaced by hydroxyl ion.

4. In a process for obtaining an insoluble, solid, apparently crystalline hydrate of alumina from an aluminum alum, the steps which comprise dispersing said crystalline alum in a mixture of a concentrated aqueous solution of sodium hydroxide with a solution-inhibiting agent selected from the group consisting of glycerine, ethanolamines and pyridine, and allowing the mixture to stand until the negative ion of the alum has been substantially completely replaced by hydroxyl ion.

5. In a process for obtaining an insoluble, solid, apparently crystalline hydrate of alumina from an aluminum alum, the steps which comprise dispersing said crystalline alum in a mixture of a concentrated aqueous solution of potassium hydroxide with a solution-inhibiting agent selected from the group consisting of glycerine, ethanolamines and pyridine, and allowing the mixture to stand until the negative ion of the alum has been substantially completely replaced by hydroxyl ion.

6. In a process for obtaining an insoluble solid, apparently crystalline hydrate of alumina from an aluminum alum, the steps which comprise dispersing said crystalline alum in a mixture of a concentrated aqueous solution of ammonium hydroxide with a solution-inhibiting agent selected from the group consisting of glycerine, ethanolamines and pyridine, and allowing the mixture to stand until the negative ion of the alum has been substantially completely replaced by the hydroxyl ion.

7. In a process for obtaining substantially potassium-free, insoluble, apparently crystalline hydrate of alumina from a crystalline potassium-aluminum alum, the steps which comprise dispersing said crystalline alum in a mixture of a concentrated aqueous solution of an hydroxide selected from the group consisting of alkali metal hydroxides and ammonium hydroxide with a solution-inhibiting agent selected from the group consisting of glycerine, ethanolamines, and pyridine, and allowing the mixture to stand until the negative ion of the alum has been substantially completely replaced by the hydroxyl ion, filtering the mass and washing the residue free of soluble matter to obtain substantially potassium-free alumina hydrate.

8. In a process for obtaining substantially potassium-free, insoluble, apparently crystalline hydrate of alumina from a crystalline potassium-aluminum alum, the steps which comprise comminuting said alum to particles of about 12 to 60 mesh size, dispersing said crystalline alum in a mixture of a concentrated aqueous solution of an hydroxide selected from the group consisting of alkali metal hydroxides and ammonium hydroxide with a solution-inhibiting agent selected from the group consisting of glycerine, ethanolamines and pyridine, and allowing the mixture to stand until the negative ion of the alum has been substantially completely replaced by the hydroxyl ion, filtering the mass and washing the residue free of soluble matter to obtain substantially potassium-free alumina hydrate.

9. In a process for obtaining substantially potassium-free, insoluble, apparently crystalline hydrate of alumina from a crystalline potassium-aluminum alum, the steps which comprise dispersing said crystalline alum in a mixture of a concentrated aqueous solution of an hydroxide selected from the group consisting of alkali metal hydroxides and ammonium hydroxide said hydroxide being in a proportion at least equal to the combining proportions of the hydroxide with the alumina of the alum, and a solution-inhibiting agent selected from the group consisting of glycerine, ethanolamines and pyridine, and allowing the mixture to stand until the negative ion of the alum has been substantially completely replaced by hydroxyl ion, filtering the mass and washing the residue free of soluble matter to obtain substantially pure potassium-free alumina hydrate.

10. In a process for obtaining substantially potassium-free, insoluble, apparently crystalline hydrate of alumina from a crystalline potassium-aluminum alum, the steps which comprise dispersing said crystalline alum in a mixture of a concentrated aqueous solution of an hydroxide selected from the group consisting of alkali metal hydroxides and ammonium hydroxide the hydroxide being in a proportion of about six times its combining proportions with the alumina of the alum and a solution-inhibiting agent selected from the group consisting of glycerine, ethanolamines and pyridine, and allowing the mixture to stand until the negative ion of the alum has been substantially completely replaced by hydroxyl ion, filtering the mass and washing the residue free of soluble matter to obtain substantially pure potassium-free alumina hydrate.

11. In a process for obtaining substantially potassium-free, insoluble, apparently crystalline hydrate of alumina from a crystalline potassium-aluminum alum, the steps which comprise dispersing said crystalline alum in a mixture of a concentrated aqueous solution of ammonium hydroxide said hydroxide being in a proportion of about six times its combining proportion relative to the alumina of the alum and, as a solution inhibitor, triethanolamine, and allowing the mixture to stand until the negative ion of the alum has been substantially completely replaced by hydroxyl ion, filtering the mass and washing free of soluble matter to obtain substantially pure potassium-free alumina hydrate in the physical form of the original crystalline alum.

12. In a process for obtaining substantially potassium-free, insoluble, apparently crystalline hydrate of alumina from a crystalline-potassium-aluminum alum, the steps which comprise dispersing said crystalline alum in a mixture of a concentrated aqueous solution of ammonium hydroxide said hydroxide being in a proportion of about six times its combining proportion relative to the alumina of the alum and, as a solution inhibitor, glycerine and allowing the mixture to stand until the negative ion of the alum has been substantially completely replaced by hydroxyl ion, filtering the mass and washing free of soluble matter to obtain substantially pure potassium-free alumina hydrate in the physical form of the original crystalline alum.

13. In a process for obtaining substantially potassium-free, insoluble, apparently crystalline hydrate of alumina from a crystalline potassium-aluminum alum, the steps which comprise dispersing said crystalline alum in a mixture of a concentrated aqueous solution of ammonium hydroxide said hydroxide being in a proportion of about six times its combining proportion relative to the alumina of the alum and, as a solution inhibitor, pyridine and allowing the mixture to stand until the negative ion of the alum has been substantially completely replaced by hydroxyl ion, filtering the mass and washing free of soluble matter to obtain substantially pure potassium-free alumina hydrate in the physical form of the original crystalline alum.

CHARLES L. FAUST.

REFERENCES CITED

The following references are of record in the file of this patent:

UNITED STATES PATENTS

| Number | Name | Date |
| --- | --- | --- |
| 1,162,130 | Buchner | Nov. 30, 1915 |

FOREIGN PATENTS

| Number | Country | Date |
| --- | --- | --- |
| 554,591 | Great Britain | July 12, 1943 |